T. A. YAPP.
VALVE FOR AUTOMOBILE DRIP PANS.
APPLICATION FILED MAY 24, 1909.

942,232.

Patented Dec. 7, 1909.

WITNESSES:
Richard Sommer
John H. Shoemaker

INVENTOR
Thomas A. Yapp,
BY
Geyer & Popp
ATTORNEYS.

UNITED STATES PATENT OFFICE.

THOMAS A. YAPP, OF BUFFALO, NEW YORK, ASSIGNOR TO E. R. THOMAS MOTOR COMPANY, OF BUFFALO, NEW YORK, A CORPORATION OF NEW YORK.

VALVE FOR AUTOMOBILE DRIP-PANS.

942,232.        Specification of Letters Patent.        Patented Dec. 7, 1909.

Application filed May 24, 1909. Serial No. 497,960.

*To all whom it may concern:*

Be it known that I, THOMAS A. YAPP, a citizen of the United States, residing at Buffalo, in the county of Erie and State of New York, have invented a new and useful Improvement in Valves for Automobile Drip-Pans, of which the following is a specification.

Automobiles are now generally provided with a catch or drip pan which is arranged underneath the driving and other mechanism so as to catch the waste oil dropping from the same and prevent the same from reaching the street or floor. This oil has usually been removed from time to time from the pan through an outlet or drain in the bottom thereof which was normally closed by a screw cap applied to the lower end of the outlet. This is objectionable because of the difficulty in gaining access to the drain and for the further reason that when the cap is removed from the lower end of the drain by hand the latter is unavoidably deluged with oil, grease and dirt which escape immediately upon removal of the drain cap. Owing to the unpleasantness attending the removal of the waste oil in this manner the operators are very much inclined to let the oil accumulate in the pan where it becomes thick and finally spills over the sides of the pan thus rendering the owner of the automobile liable under the law.

The object of this invention is to provide a valve for the drip or oil pans of automobiles which will reliably close the drain when in use and which can be easily and conveniently opened to permit of discharging the oil in the pan through said drain without liability of soiling the hands, thereby leading to more frequent emptying of the drip pan.

Figure 1:
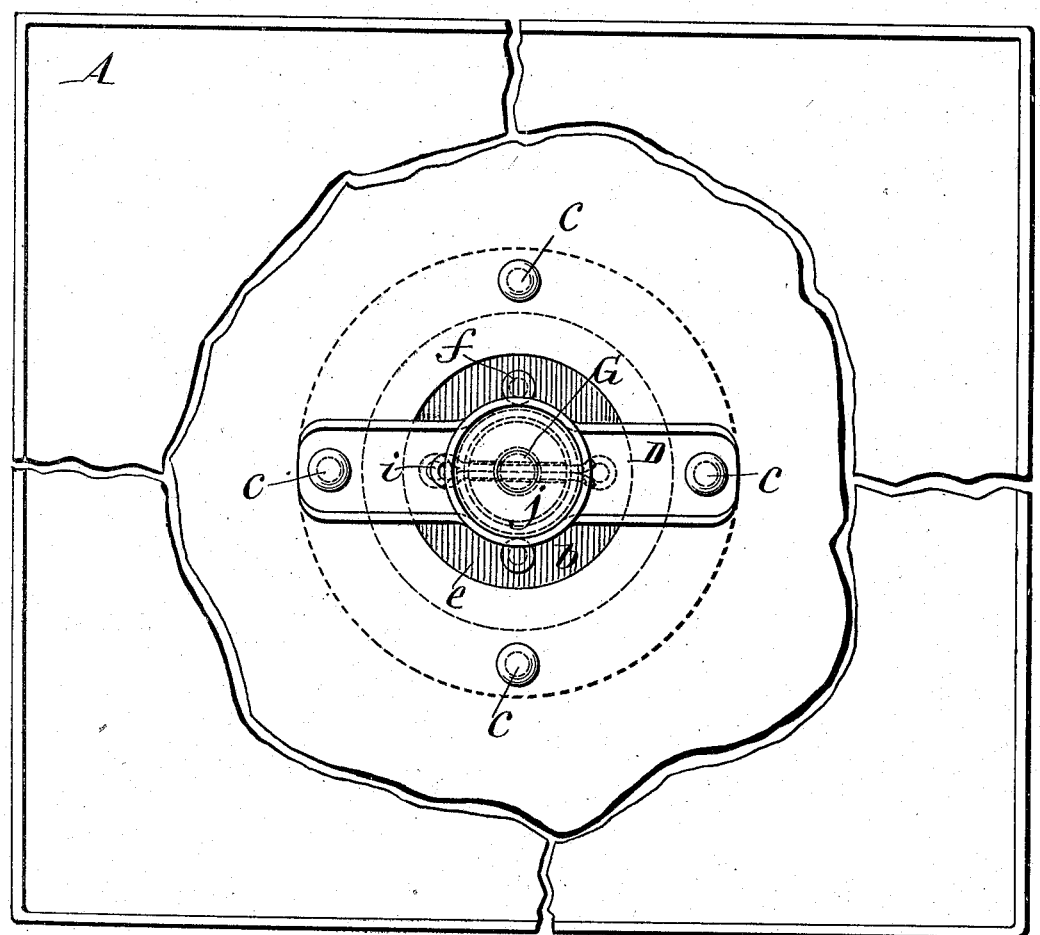
Figure 2:
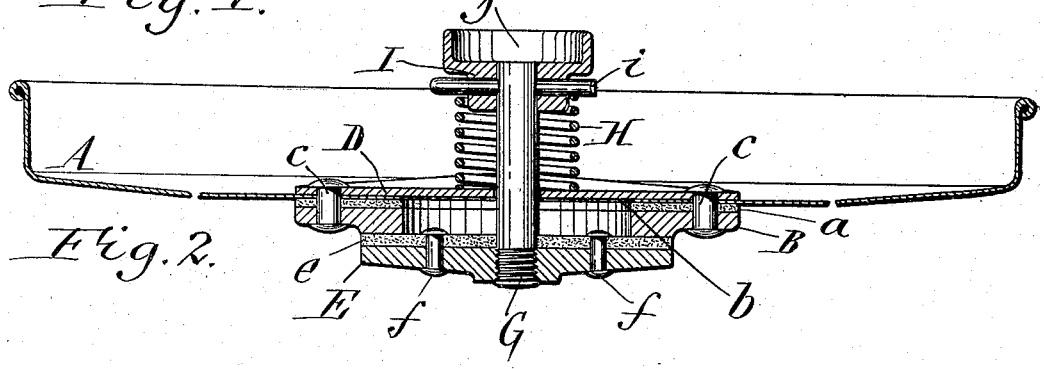

In the accompanying drawings: Figure 1 is a top plan view of a drip pan provided with my improved drain valve. Fig. 2 is a vertical section of the same.

Similar letters of reference refer to like parts in both figures.

A represents the pan or tray which is suspended below the driving mechanism and associated parts of the automobile in any suitable manner and which catches the drippings of oil and grease from said mechanism. The bottom of this pan slopes toward an outlet or drain opening $b$ which is preferably arranged near the center of the pan and through which the oil and grease in the pan is discharged downwardly. This drain or outlet is closed when the pan is in use but opened when the same is to be emptied of its contents. My improved valve whereby this drain is controlled is constructed as follows:—B represents an annular valve seat or ring which is arranged underneath the pan and which together with a packing ring $a$ of leather or other suitable material interposed between the underside of the pan and the upperside of the valve ring is secured to the pan by rivets $c$ or otherwise. Above the bottom of the pan and extending across the drain or outlet thereof is a transverse guide bar D which has a central guide opening and which is secured at opposite ends to the top of the pan bottom by two of the rivets $c$ which fasten the valve ring and packing to the underside of the same.

E represents a valve disk, stopper or closure which is adapted to move vertically toward and from the seat on the underside of the valve ring for opening and closing the port or passage therein and which has a packing disk $e$ secured to its face or upper side by means of rivets $f$ or otherwise for producing a tight joint with the valve ring when closed. This valve disk is guided in its movement toward and from the valve ring by an upright valve stem G which is secured at its lower end by a screw joint with the central part of the valve disk while its central part is guided in the central opening of the transverse guide bar D. The valve disk is yieldingly held in its elevated closed position by a spring H surrounding the upper part of the valve stem and bearing at its lower end against the top of the guide bar while its upper end bears against the under side of a head or collar I which is secured to the upper end of the valve stem by a transverse cotter or pin $i$ or otherwise.

When the pan is in use the valve disk is held tight against the valve ring by the spring so as to close the valve drain, thereby causing the oil dripping from the driving mechanism to be caught and collect in the pan. When it is desired to empty the pan it is only necessary to push the valve disk down by applying a downward pressure to the upper end of the valve stem, thereby moving the valve disk away from the valve ring and uncovering the drain or outlet so that the contents of the pan can escape through the same.

To permit of conveniently opening the valve disk without engaging the stem by hand the head I has its upper side constructed in the form of an upwardly opening cup or pocket *j*, as shown in the drawings, which pocket is adapted to receive the front end of a stick or similar instrument in the hands of the operator and permits the latter to depress the valve disk without reaching the hand under the driving mechanism. By this means not only the hands of the operator are saved from becoming soiled as is the case when removing the cap from the underside of the drain opening as has been customary heretofore but it also prevents getting oil and grease on the clothing and the operation of emptying the pan is rendered more convenient so that a person is likely to empty the pan before the oil has accumulated to such an extent as would cause it to spill or splash over the sides of the pan.

I claim as my invention:

1. A valve for the drain openings of automobile drip pans comprising a valve ring adapted to be secured to the underside of said pan around its drain opening, a guide bar secured to the upper side of said pan across said opening, a valve disk movable toward and from the underside of said ring, a valve stem connected at its lower end with the disk and guided with its central part in said bar, a head arranged on the upper end of said stem and a spring interposed between said bar and head and operating to hold the disk yieldingly in its closed position.

2. A valve for the drain openings of automobile drip pans comprising a valve ring adapted to be secured to the underside of said pan around its drain opening, a guide bar secured to the upper side of said pan across said opening, a valve disk movable toward and from the underside of said ring, a valve stem connected at its lower end with the disk and guided with its central part in said bar, a head arranged on the upper end of said stem and having a cup-shaped upper side, and a spring surrounding the upper part of the stem and engaging its upper and lower ends with said head and bar for holding the disk yieldingly in its closed position.

Witness my hand this 21st day of May, 1909.

THOMAS A. YAPP.

Witnesses:
 THEO. L. POPP,
 ANNA HEIGIS.